(12) United States Patent
Kruse

(10) Patent No.: US 6,946,768 B2
(45) Date of Patent: Sep. 20, 2005

(54) POLE WINDING PATTERN HAVING PARALLEL WOUND PATHS

(75) Inventor: Ralf Kruse, Würzburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/726,083

(22) Filed: Dec. 2, 2003

(65) Prior Publication Data

US 2004/0108783 A1 Jun. 10, 2004

Related U.S. Application Data

(63) Continuation of application No. PCT/DE02/01922, filed on May 24, 2002.

(30) Foreign Application Priority Data

Jun. 6, 2001 (DE) .................................. 101 27 364

(51) Int. Cl.[7] .......................... H02K 1/00; H02K 3/00; H02K 19/26; H02K 21/00; H02K 23/40
(52) U.S. Cl. ................. 310/179; 310/180; 310/184; 310/254; 310/268
(58) Field of Search ................ 310/49 R, 179–180, 310/184, 254, 268

(56) References Cited

U.S. PATENT DOCUMENTS

| | | | | |
|---|---|---|---|---|
| 3,450,971 A | | 6/1969 | Rawcliffe et al. ........... 318/704 |
| 3,686,553 A | * | 8/1972 | Broadway et al. .......... 318/737 |
| 3,794,870 A | * | 2/1974 | Broadway et al. .......... 310/180 |
| 3,898,543 A | * | 8/1975 | Broadway et al. .......... 318/773 |
| 4,307,311 A | * | 12/1981 | Grozinger ................. 310/179 |
| 4,331,896 A | * | 5/1982 | Sedgewick ................ 310/179 |
| 4,340,833 A | * | 7/1982 | Sudo et al. ............... 310/268 |
| 4,417,192 A | * | 11/1983 | Ghosh .................... 318/797 |
| 4,752,707 A | * | 6/1988 | Morrill .................... 310/184 |
| 4,883,999 A | * | 11/1989 | Hendershot .............. 310/254 |
| 4,947,072 A | * | 8/1990 | Watkins et al. ........... 310/179 |
| 5,343,105 A | * | 8/1994 | Sakabe et al. ............ 310/179 |
| 5,519,266 A | * | 5/1996 | Chitayat ................... 310/12 |
| 5,654,602 A | * | 8/1997 | Willyoung ................ 310/179 |
| 5,714,821 A | * | 2/1998 | Dittman ................... 310/179 |
| 5,723,931 A | * | 3/1998 | Andrey .................... 310/179 |
| 5,874,795 A | * | 2/1999 | Sakamoto ............. 310/156.12 |
| 5,898,251 A | * | 4/1999 | Mochizuki et al. ........ 310/179 |
| 5,994,812 A | * | 11/1999 | Muszynski ............... 310/180 |
| 6,097,127 A | * | 8/2000 | Rivera .................... 310/184 |
| 6,114,782 A | * | 9/2000 | Lin et al. ................. 310/49 R |
| 6,121,707 A | * | 9/2000 | Bell et al. ................. 310/179 |
| 6,281,609 B1 | * | 8/2001 | Itami et al. ............... 310/68 B |
| 6,323,574 B1 | * | 11/2001 | Takura ................... 310/179 |
| 6,331,760 B1 | * | 12/2001 | McLane, Jr. .............. 318/767 |
| 6,376,960 B1 | | 4/2002 | Milet et al. ............... 310/180 |
| 6,472,790 B2 | * | 10/2002 | Rose, Sr. ................ 310/184 |
| 6,628,034 B2 | * | 9/2003 | Jang et al. ............... 310/210 |
| 6,710,495 B2 | * | 3/2004 | Lipo et al. ............... 310/184 |
| 6,727,625 B2 | * | 4/2004 | Ooiwa .................... 310/184 |
| 6,847,146 B2 | * | 1/2005 | Hessenberger et al. ..... 310/179 |
| 6,847,147 B2 | * | 1/2005 | Gladkov .................. 310/179 |

FOREIGN PATENT DOCUMENTS

| | | | | |
|---|---|---|---|---|
| DE | 41 26 019 A1 | 2/1992 | ......... H02K/19/12 |
| EP | 0 345 915 A1 | 2/1989 | ......... H02K/44/06 |
| EP | 0 991 164 A2 | 9/1999 | ........... H02K/3/28 |

* cited by examiner

*Primary Examiner*—Darren Schuberg
*Assistant Examiner*—Pedro J. Cuevas
(74) *Attorney, Agent, or Firm*—Baker Botts L.L.P.

(57) ABSTRACT

The winding (W1) comprises at least two poles and at least one phase, with which the poles are wound. The phase comprises at least two parallel-wired winding branches (1WA, 1WB, 1WC, 1WD). At least two of the winding branches (1WA, 1WB) are different from each other in the winding of at least one of the poles (P1). At least one pole (P1) is wound from at least two winding branches (1WB, 1WC, 1WD). At least one of the winding branches (1WA, 1WB, 1WC, 1WD) is included in the winding of at least two poles. The poles are wound with the winding branches (1WA, 1WB, 1WC, 1WD) in the sense of an essentially symmetrical current loading of the phase.

20 Claims, 7 Drawing Sheets

POLE WINDING PATTERN HAVING PARALLEL WOUND PATHS

CROSS REFERENCE TO RELATED APPLICATION

This application is a continuation of copending International Application No. PCT/DE/02/01922 filed May 24, 2002, which designates the United States, and claims priority to German application number 10127364.9 filed Jun. 6, 2001.

TECHNICAL FIELD OF THE INVENTION

The invention relates to a winding.

BACKGROUND OF THE INVENTION

Current-carrying windings are used to generate magnetic fields. In particular, they can be used for electromagnetic energy conversion. For example, electric energy can be converted to mechanical energy by means of a winding (electromotive principle). If the winding is employed in a transformer, the winding serves to convert electric energy into electric energy.

The amount of electromagnetically converted power is governed by the product of the voltage across the winding and the current flowing through the winding. For motor operation, the voltage and current are generally subject to certain constraints. For example, the voltage of an integral starter/generator must not exceed the vehicle electrical system voltage of e.g. 42 volts.

The ratio of voltage to current can be varied by means of the voltage-holding turns count of the winding. This enables the operating range of the voltage and current to be adapted to suit requirements with the electromagnetically converted power remaining unchanged. It is therefore desirable to be able to finely adjust the voltage-holding turns count.

In the case of a rotating field winding laid in slots, as frequently used in electric motors, the voltage-holding turns count of a phase of the winding is given by the following formula:

$$w = \frac{p \times q \times z_N}{a}$$

where p is the number of pole pairs of the winding, q the number of slots per pole per phase, $z_N$ the number of conductors per slot and a the number of parallel paths per phase of the winding. A phase is part of the winding and defined in that all its paths are connected in parallel and the same control voltage is applied to them.

The parameters p, q, $z_N$ and a will be explained in the following with reference to two examples of the prior art.

FIG. 1a shows a cross-section through a motor stator with a first winding W according to the prior art. The stator S has twenty-four slots 1, ..., 24. The winding W is implemented as a wave winding and consists of three phases each with a single path W1, W2, W3. For this example, therefore, a=1. The path W1 of a first phase of the winding W is runs along eight of the slots 1, 4, 7, 10, 13, 16, 19, 22. At the outer sides of the stator S are located sections of the winding W, the so-called end connectors, which interconnect the sections of the winding W laid in the slots.

FIG. 1b schematically illustrates the path W1 of the first phase of the winding W from FIG. 1a. The vertical sections of the path W1 are laid in the slots, whereas the horizontal sections of the path W1 constitute the end connectors. A vertical and a horizontal section of the path W1 form a magnetic pole P. The winding W therefore has eight poles P and consequently four pole pairs. For this example, therefore, p=4. As each pole obviously only has one slot, we have q=1. Likewise obviously, only one conductor is disposed in each slot involved, so that $z_N$=1. The voltage-holding turns count of the first winding W is consequently $$w = \frac{4 \times 1 \times 1}{1} = 4.$$

FIG. 2 shows a schematic view of a phase of a second winding according to the prior art. Each phase of the second winding has a single path W1', so that a=1. The path W1' is wound twice around the circumference of the stator. The path W1' therefore has two sub-sections T1, T2 each winding the stator once as a wave winding. In addition, the second winding has four poles and therefore two pole pairs, each pole being assigned two slots, i.e. each pole is formed by two slot coils. Thus the first pole is assigned the slots 1 and 2. Consequently q=2. As in the first example, $z_N$=1. The voltage-holding turns count of the second winding is therefore $$w = \frac{2 \times 2 \times 1}{1} = 4$$

The number of pole pairs and the number of slots per pole per phase are determined according to the application or limited by external constraints. Thus, for example, in the case of the starter/generator, the mounting space generally requires a high pole pair count. In the case of asynchronous machines, for example, a value of at least q=3 is selected where possible for the number of slots per pole per phase in order to minimize the harmonic field scattering and thereby improve operating performance. Nor can the number of parallel paths be randomly selected in order to obtain a required voltage-holding turns count. As explained e.g. in "Asynchronmaschinen" (Asynchronous Machines), H. Jordan et al, pp. 105-106, the number of poles 2p must be an integral multiple of the number of paths, as the paths each wind different sub-areas of the magnetic circuit and these sub-areas must be of equal length (cf. also "Lehrbuch der Wicklungen elektrischer Maschinen" (Manual of Electric Machine Windings), R. Richter, pp.105-106). Moreover, it is generally disadvantageous to provide more than one path, as lossy circulating currents between the paths are produced in the event of asymmetries in the motor (e.g. rotor eccentricities) if there are a plurality of paths. If a risk of asymmetries exists, a single path is generally provided per phase, i.e. a=1.

Essentially, therefore, the voltage-holding turns count must only be influenced by the number of conductors per slot. However, a change of only one in the number of conductors per slot means that the voltage-holding turns count is changed by a factor of $$\frac{p \times q}{a}.$$

Fine adjustment of the voltage-holding turns count and therefore of the ratio of voltage to current by the winding cannot be achieved in this way. This applies particularly to cases in which the number of conductors per slot must be low because of the required relationship between voltage and current.

SUMMARY OF THE INVENTION

The object of the invention is to specify a winding allowing fine adjustment of the voltage-holding turns count.

This object is achieved by a winding having the following features:

The winding has at least two poles. The winding additionally has at least one phase by which the poles are wound and at least two parallel paths. At least two of the paths differ from one another in the winding of at least one of the poles. At least one pole is wound by at least two paths. At least one of the paths is involved in the winding of at least 2 poles. The poles are wound by the paths so as to provide an essentially symmetrical electric loading of the phase.

As at least one pole is differently wound by at least two of the paths, this enables the voltage-holding turns count to be finely adjusted, as will be illustrated below with reference to the embodiments.

Despite the poles being wound differently, the magnetic field generated by the winding is symmetrical, i.e. identical for each pole apart from the polarity reversal, as the poles are wound by the paths so as to produce an essentially symmetrical electric loading. The electric loading is the sum of the currents flowing through all the winding sections at a specific location. An essentially symmetrical electric loading means that the electric loading is essentially equal for all the poles apart from the change of sign.

As at least one pole is wound by at least two paths, these paths jointly wind at least one sub-area of the magnetic circuit. Asymmetries (e.g. rotor eccentricities) affecting said sub-area have the same effect on both paths, so that no circulating currents between the paths result from said asymmetries. The more paths are simultaneously involved in winding of many poles as possible, the less any asymmetries will cause circulating currents between the paths. There is therefore no disadvantage in providing more than a single path per phase.

As at least one pole is wound by at least two paths, it is impossible for the different winding to consist in each pole being assigned only one path by which the relevant pole is exclusively wound.

As at least one of the paths is involved in winding at least two poles, it is impossible for the different winding to consist in each path being only involved in winding a single pole.

For example, the windings assigned to the paths of at least one pole can differ from one another in respect of the numbers of turns.

Thus one path can wind the pole with one or more turns less or more than another path.

To reduce circulating currents between the paths it is advantageous if the turns counts of the paths for the pole are not markedly different from one another. The turns count difference is preferably 1.

Particularly low circulating currents and a particularly symmetrical electric loading are achieved if the sum of the turns counts of all the paths is the same for each pole. This means that each pole is equally heavily wound by the winding. With a large number of poles, any deviation of the sum of the turns counts of all the paths for one or a small number of poles from the sums for the remaining poles has only a negligible effect on the circulating currents and the electric loading, so that it suffices if the sum of the turns counts of all the paths is only essentially the same for each pole.

For example, at least one of the paths can wind at least one of the poles more lightly than the remaining poles. The number of turns with which a pole is less wound by a path than the remaining poles will hereinafter be referred to as the number of missing turns.

A pole will therefore be more lightly wound by e.g. half a missing turn. The lighter winding of the pole by the path can extend to the pole not being wound at all by the path.

The voltage-holding turns count of a winding with missing turns is generally less than the voltage-holding turns count of a corresponding winding without missing turns. The more paths have missing turns and the more missing turns the individual path has, the lower in general the voltage-holding turns count.

The number of missing turns need not be identical for all the poles with missing turns. However, in order to achieve an electric loading that is as symmetrical as possible, it is advantageous if all the missing turns of the winding are distributed as evenly as possible over the poles.

In order to avoid circulating currents, it is advantageous if the number of missing turns is essentially the same for each path.

For example, the winding can have the following features: the winding has 2×p poles forming p pole pairs. The winding additionally has p paths. The poles are differently wound by the paths in that each path is less heavily involved in the winding of a pole pair than the remaining paths.

Each pole pair is therefore assigned a path by which it is more lightly wound than by the remaining paths. Each path therefore winds one pole pair more lightly than the remaining paths.

If pole pairs are more lightly wound by paths, this requires longer end connectors by means of which the relevant paths are routed past the thereby more lightly wound pole pairs. For the winding with the p pole pairs and p paths described above, all the extended end connectors are on the same slot end side, i.e. end face, which means that the winding is weighted and thickened on one side.

A symmetrical distribution of the extended end connectors is achieved by the following winding:

The winding has 2×p poles and 2×p paths. The poles are differently wound by the paths in that each path winds two adjacent poles more lightly than the remaining poles, each pole being more lightly wound by two paths than by the remaining paths and a pole adjacent to said pole being differently wound by the two paths.

For this winding, p of the two×p paths are identical to the p paths of the previous winding which has p paths. The remaining p paths constitute symmetrical mirror images, shifted by one pole with respect to the longitudinal winding axis, of the p paths of the previous winding.

Instead of winding at least one pole more lightly than the remaining poles, a path can wind at least one pole more heavily than the remaining poles.

The turns with which a pole is more heavily wound than the remaining poles will hereinafter be referred to as the additional turns. A pole will therefore be more heavily wound by e.g. half an additional turn.

It is within the scope of the invention to provide a winding having both missing turns and additional turns. Even one and the same path can have both missing and additional turns.

The voltage-holding turns count of a winding with additional turns is generally greater than the voltage-holding turns count of a corresponding winding without additional turns. The more paths have additional turns and the more additional turns a path has, the higher in general the voltage-holding turns count.

The number of additional turns need not be the same for all the poles with additional turns. However, in order to achieve a electric loading that is as symmetrical as possible, it is advantageous if all the additional turns of the winding are distributed as evenly as possible over the poles.

In order to avoid circulating currents, it is advantageous if the number of additional turns is essentially the same for each path.

The winding can have, for example, the following features:

The winding has two×p poles forming p pole pairs. The winding additionally has p paths. The poles are differently wound by the paths in that each path winds a pole pair more heavily than the remaining paths.

Each pole pair is therefore assigned one path by which it is more heavily wound than by the remaining paths. Each path therefore winds one pole pair more heavily than the remaining paths.

In this example, all the end connectors additionally required by the heavier winding are on the same slot end side, i.e. end face, which means that the winding is weighted and thickened on one side.

A symmetrical distribution of the extended end connectors is achieved by the following winding:

The winding has 2×p poles and 2×p paths. The poles are differently wound by the paths in that each path winds two adjacent poles more heavily than the remaining poles, each pole being more heavily wound by two paths than by the remaining paths and a pole adjacent to said pole being differently wound by the two paths. p of the 2×p paths are identical to the p paths of the previous winding with p paths. The remaining p paths constitute symmetrical mirror images, shifted by one pole with respect to the longitudinal winding axis, of the p paths of the previous winding.

The poles can be formed by a plurality of slot coils. In this case it is possible for the path-assigned windings of at least one pole to differ from one another in respect of the turns counts of the slot coils of the pole.

Circulating currents can be particularly effectively prevented in this case by making the turns counts of the paths the same for as many poles as possible. The turns counts of each path are preferably the same for all the poles. Missing or additional turns only occur in this case in the slot coils, but not when considering the overall winding of a pole.

The number of missing turns of a path for a slot coil can be so high that the slot coil is omitted completely.

It is not necessary for the number of missing or additional turns to be the same for all the slot coils with missing or additional turns.

The winding or a path can simultaneously have missing and additional turns.

A particularly symmetrical electric loading can be achieved if the sum of the turns counts of all the paths is the same for each slot coil of the one or more poles. It is advantageous if this also applies to as many other poles as possible.

Each path can have at least two sub-sections, each sub-section winding each pole with half a turn, and each sub-section involved to the extent of no more than half a turn in winding the same slot coil.

The winding is therefore implemented as a wave winding, each sub-section of the winding likewise forming a wave winding.

For example, the winding can have two parallel paths, each path having three sub-sections. Each pole can be formed by two slot coils. Each slot coil can be wound by two sub-sections of one of the paths and by one sub-section of another of the paths.

As each slot coil is wound with a total of three half turns, and each pole is formed by two slot coils, each pole is wound by the winding with three turns and the sum of the turns counts of all the paths is equal to three halves for each slot coil.

If the turns counts for each path are the same for each pole, one slot coil of each pole must be wound by both sub-sections of the first path and by one sub-section of the second path, whereas the other slot coil of each pole must be wound by both sub-sections of the second path and by one sub-section of the first path.

To reduce circulating currents between the paths, it is advantageous if each path winds exactly as many left slot coils of poles as right slot coils of the poles. If the winding is implemented as a rotating field winding and the rotating field circulates from the left slot coil of a pole to the right slot coil of a pole, the voltage induced in left slot coils always leads the voltage induced in the right slot coils. An uneven distribution of the turns of a path between the left slot coils and the right slot coils of the poles produces circulating currents between the paths.

It is within the scope of the invention if the winding exhibits the following features: the winding has two paths. Each pole is formed by two slot coils. Each path winds only one slot coil of each pole.

If the sub-sections wind slot coils with half a turn in each case, the paths are generally implemented as wave windings.

The poles can be evenly disposed along a self-contained line.

For example, the winding is a ring winding of a stator.

The winding can have more than one phase, the phases being able to carry sinusoidally varying current and be driven phase-shifted with respect to one another, so that the winding can be used as a rotating field winding. It is possible to use a single-phase sinusoidal winding as a rotating field winding.

However, the invention can be applied to every other possible type of winding, such as excitation windings of homopolar or synchronous machines or transformer windings with a plurality of iron cores per phase.

Preferably the number of slots per pole per phase of the winding is a positive integer. In the case of a rotating field winding, this is an integral-slot winding. In comparison to a fractional-slot winding, i.e. a winding with a fractional number of slots per pole per phase, the air-gap field of a rotating field integral-slot winding generally has fewer harmonics. The result is generally an improved operating performance.

BRIEF DESCRIPTION OF THE DRAWINGS

Embodiments of the invention will now be explained with reference to the Figures.

FIG. 1b schematically illustrates the path W1 of the first phase of the winding W from FIG. 1a.

DETAILED DESCRIPTION OF THE PREFERRED EMBODIMENTS

Figure 3:
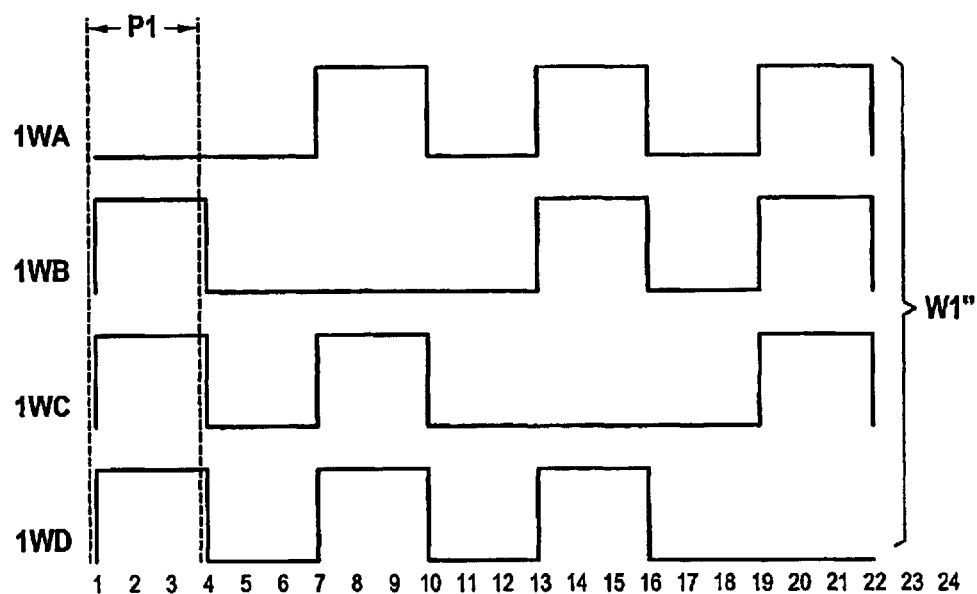
FIG. 3 schematically illustrates a first winding with 4 paths, 8 poles and 24 slots, each path having one missing turn.

In a first embodiment, there is provided a first winding W1" with three phases, each phase having four parallel paths 1WA, 1WB, 1WC, 1WD (see FIG. 3). Therefore, a=4. Only one of the three phases is shown in FIG. 3.

The paths 1WA, 1WB, 1WC, 1WD are implemented as wave windings. The first winding W1" has 24 slots 1, ... 24.

The first path 1WA runs along the slots 7, 10, 13, 16, 19, 22. The sections of the first path 1WA laid in the slots are interconnected by end connectors running outside the slots. In FIG. 3 the end connectors run horizontally, whereas the sections in the slots run vertically.

The first winding W1" has a total of eight poles each wound by three of the four paths 1WA, 1WB, 1WC, 1WD. Therefore, p=4. A pole is formed by a slot wound by the phase and the end connector extending to the right to the next slot wound by the phase. Therefore, q=1. In FIG. 3, the region of the first pole P1 is shown schematically for the phase illustrated.

The eight poles form four pole pairs. Each path is not involved in winding one pole pair.

The sum of the turns counts of all the paths for each pole is three halves. For example, the first pole P1 is wound by the second path 1WB, the third path 1WC and the fourth path WD with half a turn in each case, whereas it is not wound by the first path WA.

A total of three conductors are disposed in each slot, so that $z_N=3$.

The voltage-holding turns count of the first winding W1" is therefore:

$$w1 = \frac{4 \times 1 \times 3}{4} = 3.$$

Figure 1A:
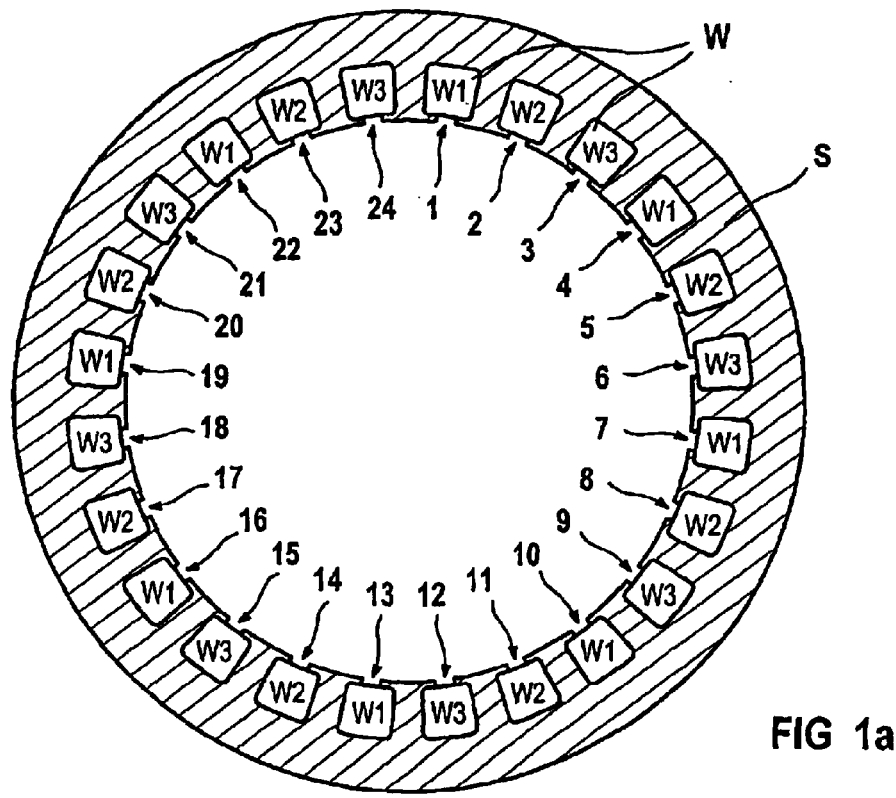
FIG. 1a shows a cross-section through a motor stator with a first winding W according to the prior art.
Figure 1B:
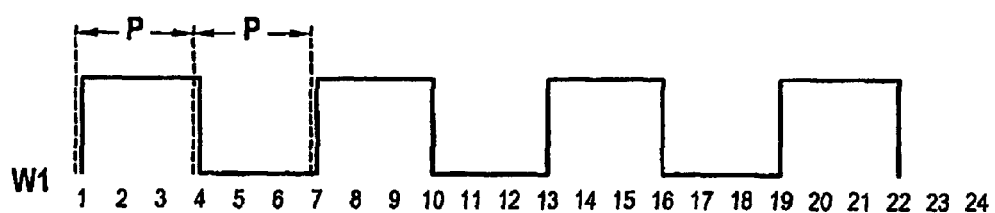
Figure 2:
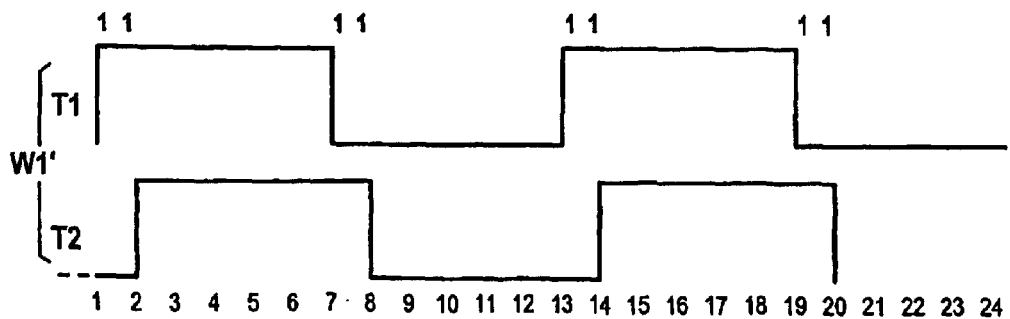
FIG. 2 shows a schematic view of a phase of a second winding according to the prior art.

A conventional winding with 4 pole pairs and q=1 slots per pole per phase would have a voltage-holding turns count of w=4, as can be seen from the first example of the prior art (see FIG. 1b). Incorporating missing turns into paths allows fine adjustment of the voltage-holding turns count to w=3. The single path winds almost all the poles. In this respect the winding distribution is relatively equal. Lossy circulating currents between the paths are virtually absent. With a higher number of poles and correspondingly more paths, the winding distribution is even more equal.

Figure 4:
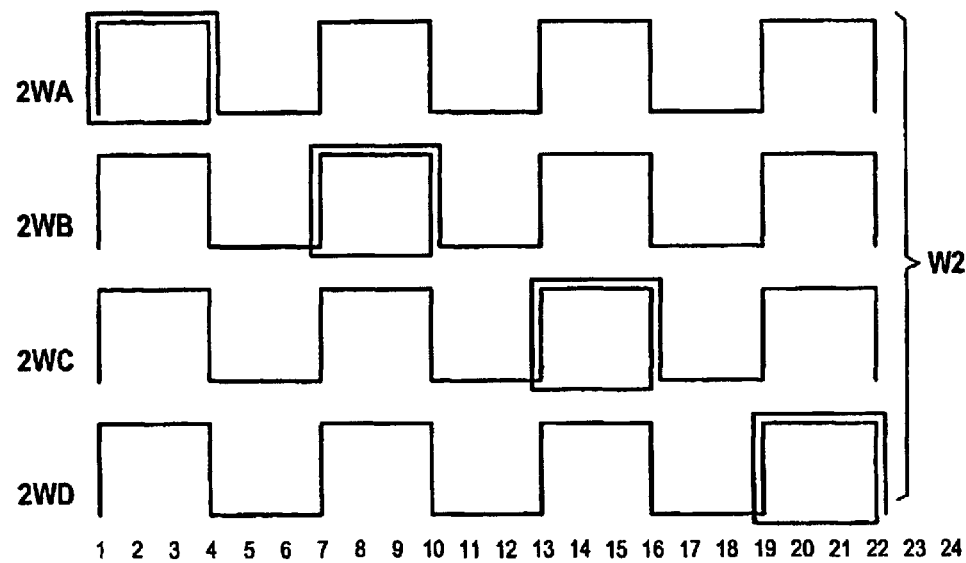
FIG. 4 schematically illustrates a second winding with 4 paths, 8 poles and 24 slots, each path having one additional turn.

In a second embodiment there is provided a second winding W2 having three phases, each phase being formed from four parallel paths 2WA, 2WB, 2WC, 2WD (see FIG. 4). Consequently, a=4. Only one of the three phases is shown in FIG. 4.

As in the first embodiment, the second winding W2 has eight poles forming four pole pairs, i.e. p=4.

In contrast to the first embodiment, each path 2WA, 2WB, 2WC, 2WD has an additional turn, the additional turns being evenly distributed over the pole pairs so that each pole pair is wound by five turns. Five conductors are disposed in each slot, so that $z_N=5$. Once again each pole is formed by a slot and the right-extending end connectors adjacent thereto, i.e. a pole is formed by one slot coil. Consequently, q=1.

The voltage-holding turns count of the second winding W2 is given by:

$$w2 = \frac{4 \times 1 \times 5}{4} = 5$$

The additional turns are implemented in the manner of a lap winding. This ensures that the four paths 2WA, 2WB, 2WC, 2WD begin and end at the same place.

Figure 5:
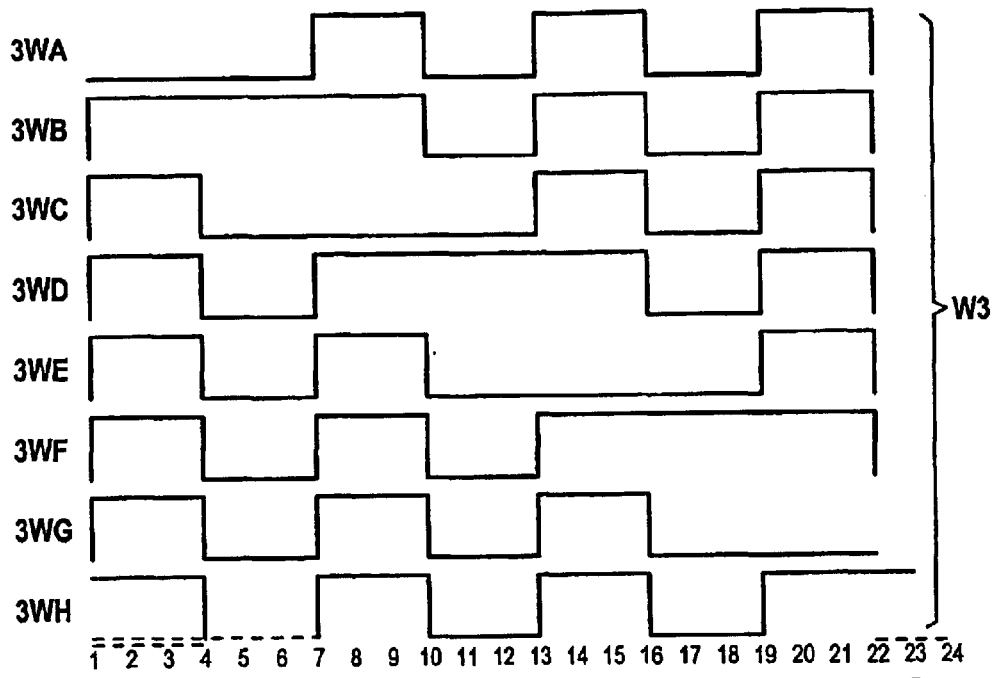
FIG. 5 schematically illustrates a third winding with 8 paths, 8 poles and 24 slots, each path having one missing turn.

In a third embodiment there is provided a third winding W3 comprising three phases, each phase having eight parallel paths 3WA, 3WB, 3WC, 3WD, 3WE, 3WF, 3WG, 3WH (see FIG. 5). Therefore, a=8. Only one of the three phases is shown in FIG. 5.

The third winding W3 has 8 poles and 24 slots 1, ... 24. Therefore, p=4.

Each of the paths does not wind two adjacent poles. Each path omits to wind a different pair of poles from the remaining paths.

The first path 3WA, the third path 3WC, the fifth path 3WE and the seventh path 3WG correspond to the paths 1WA, 1WB, 1WC, 1WD of the first embodiment. The second path 3WB corresponds to the mirror image of the first path 3WA about the winding axis, said path having been shifted one pole to the right. This applies correspondingly to the fourth path 3WD, the sixth path 3WF and the eighth path 3WH.

Each pole is therefore not wound by two paths. For example, the first pole is not wound by the first path 3WA and the eighth path 3WH.

The second pole, which is disposed to the right of the first pole, is not wound by the first path 3WA, but is wound by the eighth path 3WH. To compensate, it is not wound by the second path 3WB. Consequently, the two paths winding a pole wind a pole adjacent to said pole differently.

The sum of the turns counts of all the paths for each pole is 6 halves. Six conductors are disposed in each slot, so that $z_N=6$.

The voltage-holding turns count of the third winding W3 is therefore $$w3 = \frac{4 \times 1 \times 6}{8} = 3.$$

The extended end connectors of the paths in the area of the missing turns are evenly distributed over the two end windings, i.e. over both slot end sides, i.e. end faces.

Figure 6:
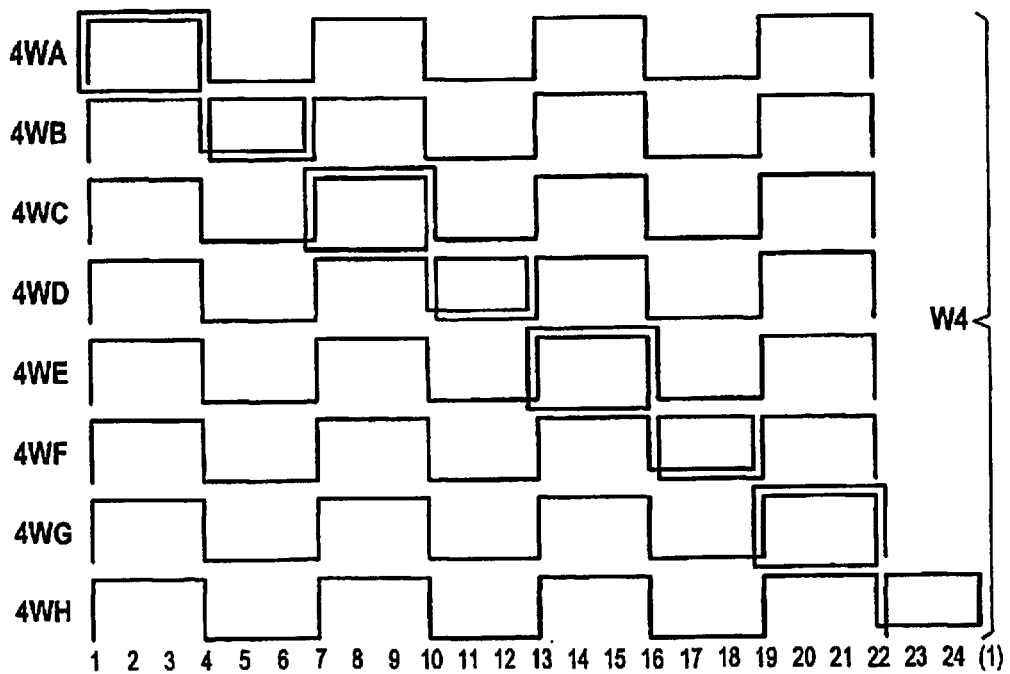
FIG. 6 schematically illustrates a fourth winding with 8 paths, 8 poles and 24 slots, each path having one additional turn.

In a fourth embodiment there is provided a fourth winding W4 with three phases, each phase being formed by eight paths 4WA, 4WB, 4WC, 4WD, 4WE, 4WF, 4WG, 4WH (see FIG. 6). Only one of the three phases is shown in FIG. 6.

The difference compared to the third embodiment is that an additional turn is introduced to each path instead of the missing turn.

10 conductors are disposed in each slot, so that $z_N$ is 10.

The voltage-holding turns count of the fourth winding W4 is therefore:

$$w4 = \frac{4 \times 1 \times 10}{8} = 5.$$

Figure 7:
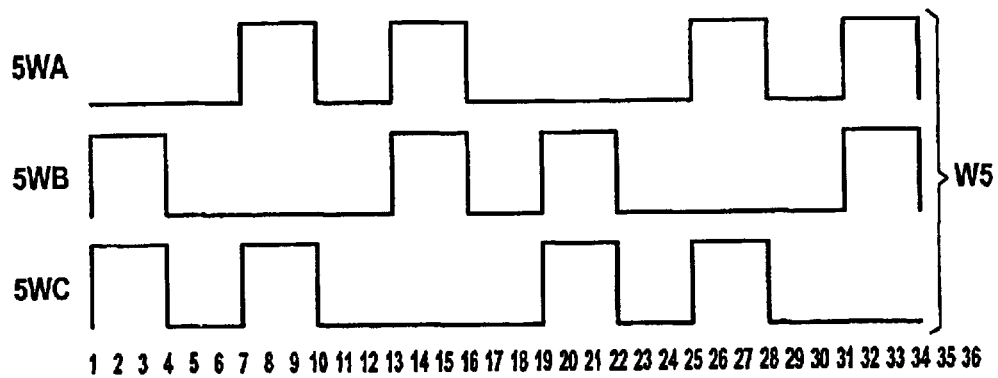
FIG. 7 schematically illustrates a fifth winding with 3 paths, 12 poles and 36 slots, each path having two missing turns.

In a fifth embodiment there is provided a fifth winding W5 having three phases, each phase being formed by three paths 5WA, 5WB, 5WC (see FIG. 7). Therefore, a=3. Only one of the three phases is shown in FIG. 7. The fifth winding W5 has twelve poles forming six pole pairs, i.e. p=6. The fifth winding W5 additionally has 36 slots 1, . . . 36.

Each path has two missing turns, so that each path does not wind two pole pairs. The missing turns are distributed equally over the poles. Each pole is wound by two half turns. This means that the sum of the turns counts of all the paths is two halves for each pole. The number of conductors in each slot is $z_N=2$.

The voltage-holding turns count of the fifth winding W5 is therefore:

$$w5 = \frac{6 \times 1 \times 2}{3} = 4.$$

Figure 8:
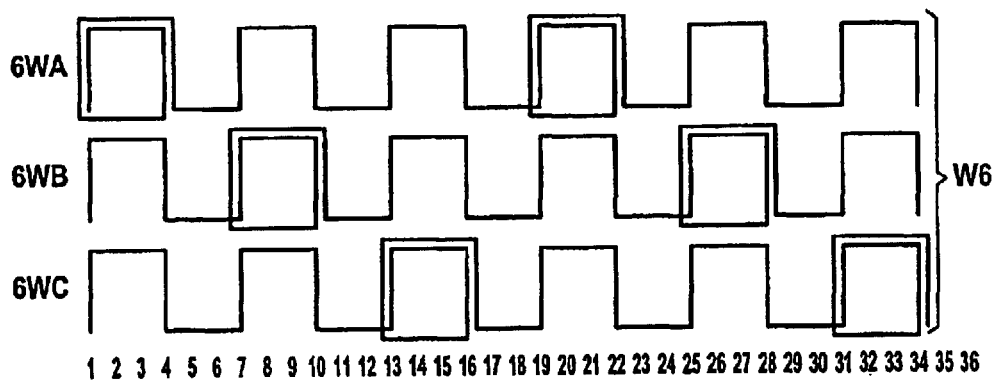
FIG. 8 schematically illustrates a sixth winding with 3 paths, 12 poles and 36 slots, each path having two additional turns.

In a sixth embodiment there is provided a sixth winding W6 essential similar to the fifth winding W5 except that additional turns are provided instead of missing turns (see FIG. 8). As the number of conductors per slot is four, the voltage-holding turns count is:

$$w6 = \frac{6 \times 1 \times 4}{3} = 8.$$

Figure 9:
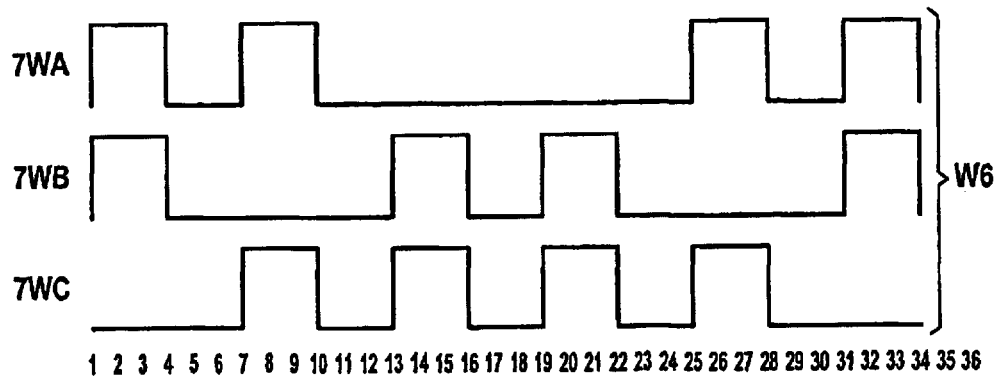
FIG. 9 schematically illustrates a seventh winding with 3 paths, 12 poles and 36 slots, each path having two missing turns.

In a seventh embodiment there is provided a seventh winding W7 essentially similar to the fifth winding W5 of the fifth embodiment, except that the paths are not laid out in the same way (see FIG. 9).

In the fifth embodiment, the sequence of turns and missing turns is the same for each path. In the seventh embodiment, on the other hand, the sequences of turns and missing turns of the second path 7WB are different from those of the first path 7WA and the third path 7WC. Both in the first path 7WA and in the third 7WC, the 4 turns are consecutive and the missing turns are consecutive. In contrast thereto, in the second path 7WB only two turns are consecutive, and the missing turns are separated from one another by two turns. Nevertheless, even in the case of the seventh winding W7, the sum of the turns counts of all the paths is two halves for each pole.

As in the fifth embodiment, the voltage-holding turns count of the seventh winding W7 is $$w7 = \frac{6 \times 1 \times 2}{3} = 4.$$

Figure 10:
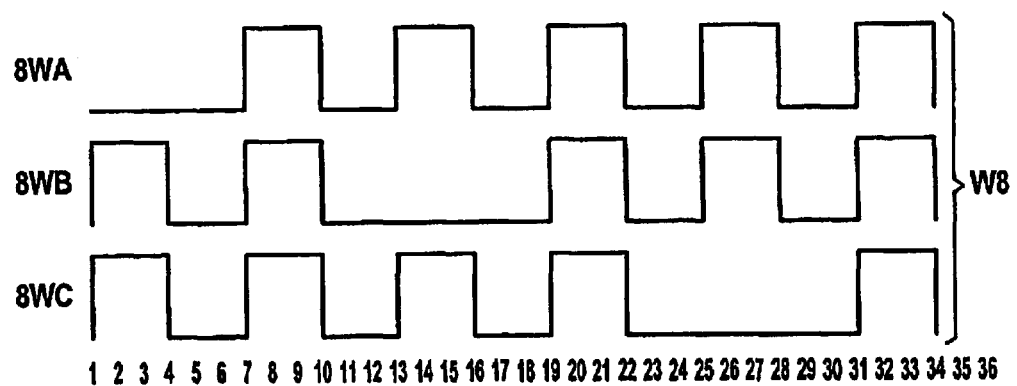
FIG. 10 schematically illustrates an eighth winding with 3 paths, 12 poles and 36 slots, each path having one missing turn.

In an eighth embodiment there is provided an eighth winding W8 which is essentially similar to the fifth winding W5 of the fifth embodiment, except that each path 8WA, 8WB, 8WC has only one missing turn instead of two missing turns (see FIG. 10). The missing turns are distributed as evenly as possible over the poles. However, the sum of the turns counts of all the paths is two halves for one half of the poles and three halves for the other half of the poles. The average number of conductors in a slot is $z_N=2.5$.

The voltage-holding turns count of the eighth winding W8 is therefore:

$$w8 = \frac{6 \times 1 \times 2.5}{3} = 5.$$

Figure 11:
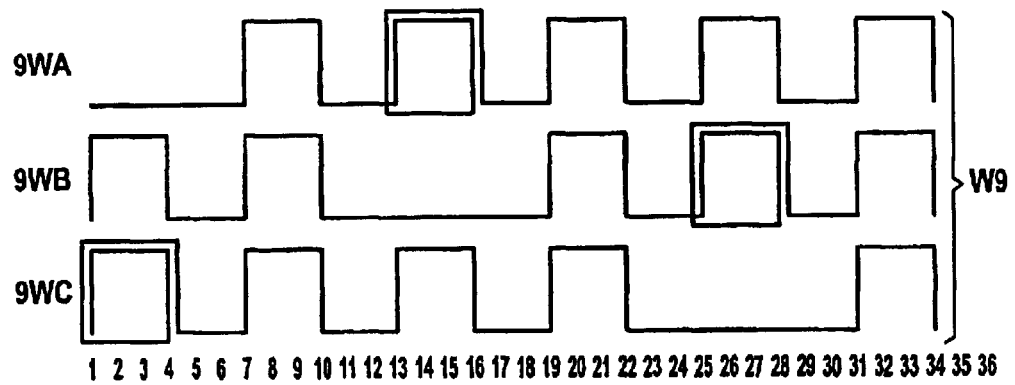
FIG. 11 schematically illustrates a ninth winding with 3 paths, 12 poles and 36 slots, each path having one missing turn and one additional turn.

In a ninth embodiment there is provided a ninth winding which is essentially similar to the fifth winding W5 of the fifth embodiment except that, instead of two missing turns, one missing turn and one additional turn are provided for each path (see FIG. 11). The missing turns and additional turns are evenly distributed over the poles so that the sum of the turns counts of all the paths is three halves for each pole. The number of conductors per slot is $z_N=3$. The voltage-holding turns count of the ninth winding W9 is:

$$w9 = \frac{6 \times 1 \times 3}{3} = 6.$$

Figure 12:
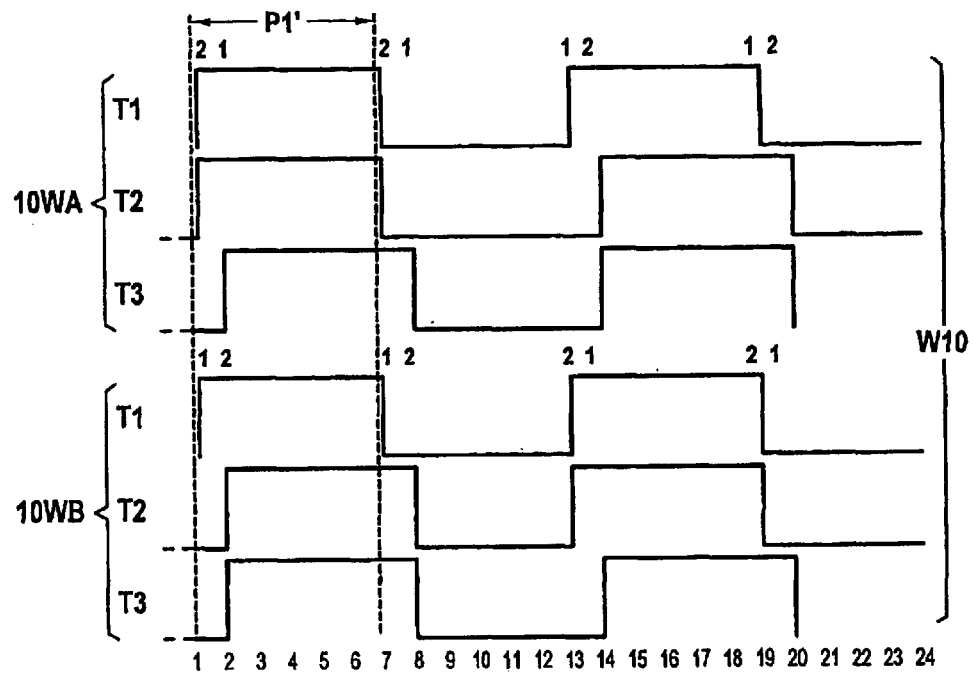
FIG. 12 schematically illustrates a tenth winding with 2 paths, 4 poles and 24 slots, each path having three sub-sections and each pole being formed from two slot coils.

In a tenth embodiment there is provided a tenth winding W10 having three phases, each phase being formed by two paths 10WA, 10WB, i.e. a=2 (see FIG. 12). Only one of the three phases is shown in FIG. 12. Each of the paths 10WA, 10WB has three series-connected sub-sections T1, T2, T3, each of which wind each pole of the tenth winding W10.

The tenth winding W10 has 4 poles and 24 slots, each pole being formed by two slot coils. Therefore, p=2 and q=2. For example, the first pole P1' is formed by the wound first slot, the wound second slot and the adjacent, right-extending end connectors. The area of the first pole P1' is illustrated in FIG. 12.

The two paths 10WA, 10WB differ from one another in respect of the turns counts of the slot coils of a pole. For example, the first path 10WA winds the first slot coil of the first pole P1' with two half turns, as the first two sub-sections T1, T2 wind the slot coil, whereas the third sub-section T3 does not wind the slot coil. However, the second path 10WB winds the first slot coil of the first pole P1' with half a turn, as the first sub-section T1 winds the first slot coil, whereas the second sub-section T2 and the third sub-section T3 do not wind the first slot coil.

For each slot coil, however, the sum of the turns counts of the two paths must be the same and equal to three halves, i.e. $z_N=3$. The poles are equally heavily wound by each path, namely by three half turns. Consequently, the sum of the turns counts of the paths is also the same for each pole and equal to six halves. As the poles are equally heavily wound by each path, circulating currents between the paths are extremely unlikely.

The first path 10WA winds the first slot coil of the first pole and the first slot coil of the second pole with two half turns, whereas it only winds the first slot coil of the third pole and the first slot coil of the fourth pole with one half turn.

For the tenth winding W10, the voltage-holding turns count is $$w10 = \frac{2 \times 2 \times 3}{2} = 6.$$

Figure 13:
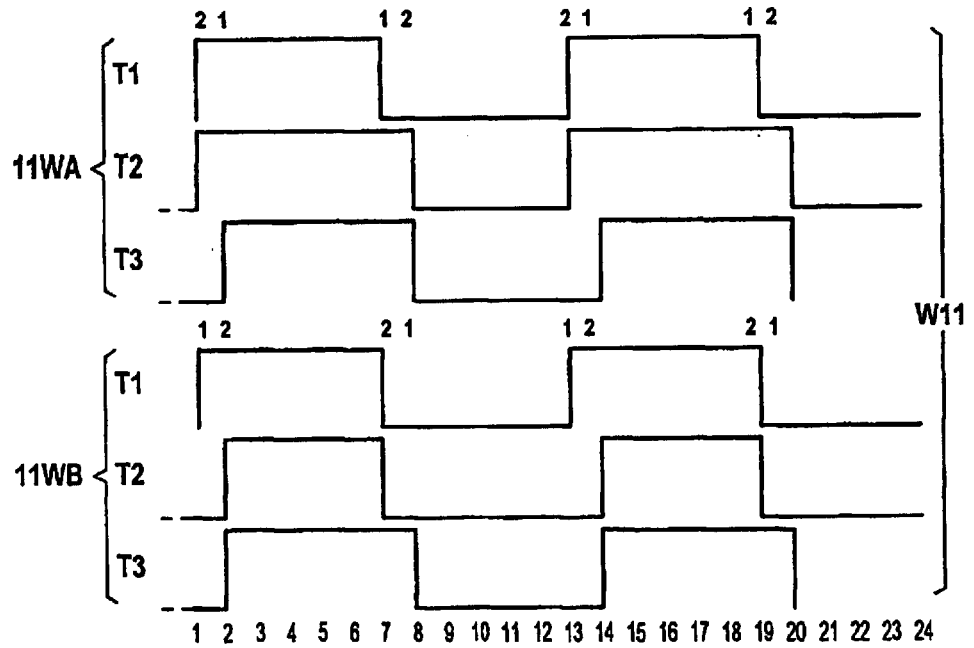
FIG. 13 schematically illustrates an eleventh winding with 2 paths, 4 poles and 24 slots, each path having three sub-sections and each pole being formed from two slot coils.

In an eleventh embodiment there is provided an eleventh winding W11 which is essentially similar to the tenth winding W10 of the tenth embodiment except that the first path 11WA winds the first slot of the first pole and the first slot of the third pole with two half turns and the first slot of the second pole and the first slot of the fourth pole with half a turn. To compensate, the second path 11WB winds the first slot of the first pole and the first slot of the third pole with half a turn and the first slot of the second pole and the first slot of the fourth pole with two half turns (see FIG. 13). As in the case of the tenth embodiment, the voltage-holding turns count for the eleventh winding W11 is $$w11 = \frac{2 \times 2 \times 3}{2} = 6.$$

Figure 14:
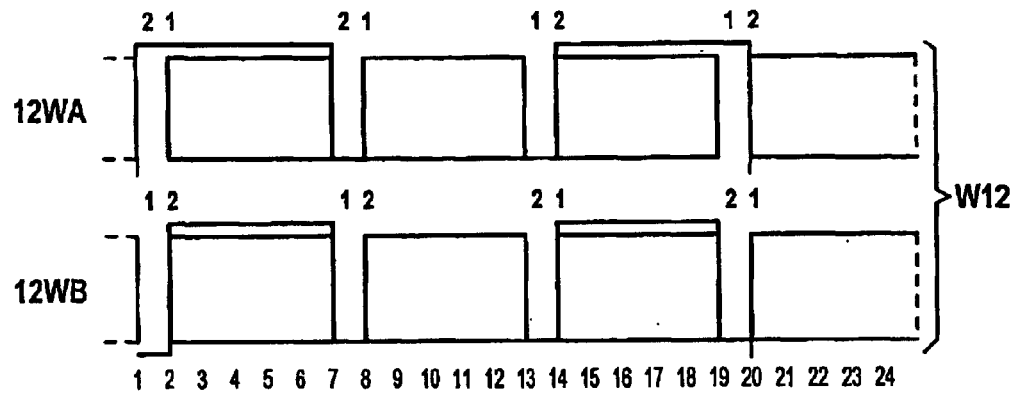
FIG. 14 schematically illustrates a twelfth winding with 2 paths, 4 poles and 24 slots, each pole being formed from two slot coils.

In a twelfth embodiment there is provided a twelfth winding W12 having three phases formed in each case by two paths 12WA and 12WB. Only one of the three phases is shown in FIG. 14. The twelfth winding W12 additionally has four poles and 24 slots. Each pole is formed by two slot coils. The distribution of turns per path corresponds to the distribution of turns per path of the tenth winding W10 of the tenth embodiment. Consequently, the twelfth winding W12 and the tenth winding W10 have the same voltage-holding turns count:

$$w12 = \frac{2 \times 2 \times 3}{2} = 6.$$

Unlike the winding W10, the twelfth winding W12 is implemented as a lap winding (see FIG. 14). Consequently, the twelfth winding W12, in contrast to the tenth winding W10, essentially has only one instead of three sub-sections for each path 12WA, 12WB.

Figure 15:
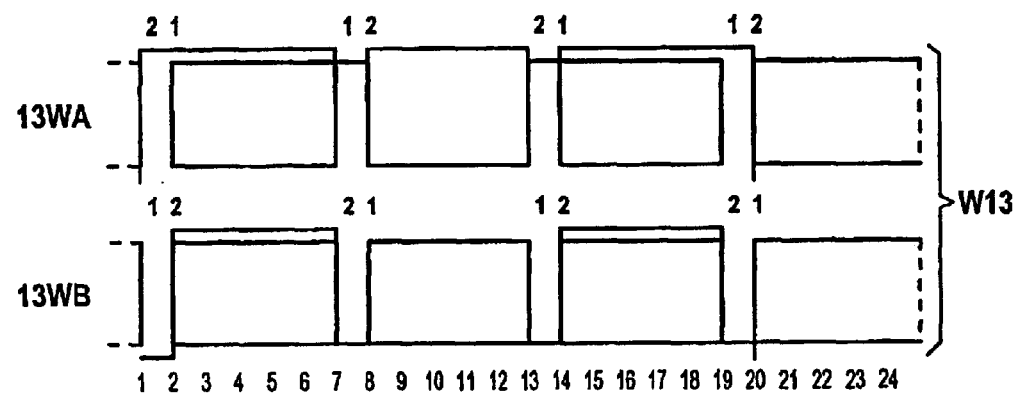
FIG. 15 schematically illustrates a thirteenth winding with 2 paths, 4 poles and 24 slots, each pole being formed from two slot coils.

In a thirteenth embodiment there is provided a thirteenth winding W13 having three phases each formed by two paths 13WA, 13WB. Only one of the three phases is shown in FIG. 15. The thirteenth winding W13 additionally has four poles and 24 slots. The distribution of turns for each path 13WA, 13WB is similar to the distribution of turns of the paths 11WA, 11WB of the eleventh winding W11 of the eleventh embodiment. However, instead of three sub-sections per path, the thirteenth winding W13 essentially has only one sub-section for each path 13WA, 13WB. The paths 13WA, 13WB are implemented as lap windings (see FIG. 15). The voltage-holding turns count of the thirteenth winding W13 is the same as that of the winding W11:

$$w13 = \frac{2 \times 2 \times 3}{2} = 6.$$

Figure 16:
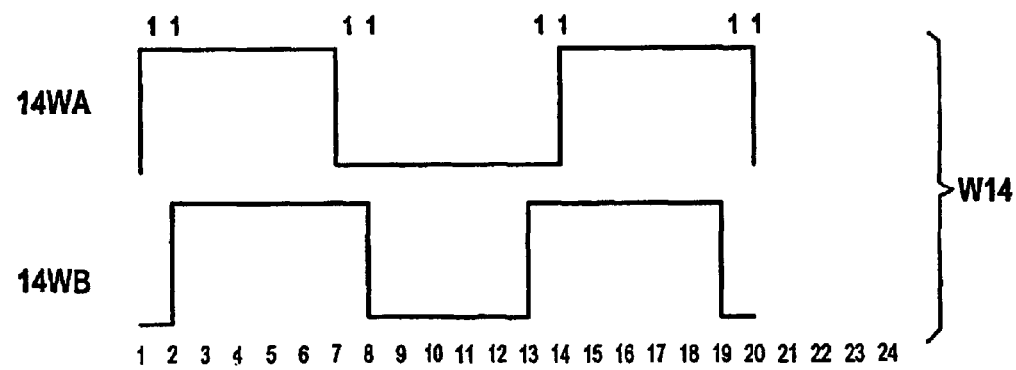
FIG. 16 schematically illustrates a fourteenth winding with 2 paths, 4 poles and 24 slots, each pole being formed from two slot coils.

In a fourteenth embodiment there is provided a fourteenth winding W14 having three phases, each phase being formed by two parallel paths 14WA, 14WB, i.e. a=2 (see FIG. 16). Only one of the three phases is shown in FIG. 16.

The fourteenth winding W14 has four poles and 24 slots. Each pole is formed by two slot coils. Therefore, p=2 and q=2.

The paths 14WA, 14WB are implemented as wave windings and each winds each pole with half a turn, said paths 14WA, 14WB in each case winding different slot coils of each pole. Thus the first path 14WA winds the first slot coils of the first and second pole and the second slot coils of the third and fourth pole, whereas the second path 14WB winds the second slot coils of the first and second pole and the first slot coils of the third and fourth pole. The number of conductors per slot is $z_N=1$. The voltage-holding turns count of the fourteenth winding W14 is $$w14 = \frac{2 \times 2 \times 1}{2} = 2.$$

I claim:

1. A winding comprising:

at least two poles, and at least one phase comprising at least two parallel paths by which the at least two poles of the at least one phase are wound, wherein at least two of the parallel paths of the at least one phase differ from one another in the winding of at least one of the poles, at least one pole is wound by at least two paths of the at least one phase, at least one of the paths is involved in the winding of at least two poles, and the poles are wound by the paths so as to produce an essentially symmetrical electric loading of the phase.

2. The winding according to claim 1, wherein the windings of the at least one pole which are assigned to the paths, differ from one another in respect of the turns counts.

3. The winding according to claim 2, wherein the sum of the turns counts of all the paths is essentially the same for each pole.

4. The winding according to claim 2, wherein at least one of the paths winds at least one of the poles more lightly than the remaining poles.

5. The winding according to claim 4, further comprising:

2×p poles forming p pole pairs, and p paths, wherein the windings of the poles by the paths differ from one another in that each path is in each case more lightly involved in the winding of each pole pair at a time than the remaining paths.

6. The winding according to claim 4, further comprising:

2×p poles, and

2×paths, wherein the windings of the poles by the paths differ from one another in that each path winds two adjacent poles more lightly than the remaining poles, each pole being more lightly wound by two paths than by the remaining paths and a pole adjacent to said pole being differently wound by the two paths.

7. The winding according to claim 2, wherein at least one of the paths winds at least one of the poles more heavily than the remaining poles.

8. The winding according to claim 7, further comprising:

2×p poles forming p pole pairs, and p paths, wherein the windings of the poles by the paths differ from one another in that each path winds one pole pair more heavily than the remaining paths.

9. The winding according to claim 7, further comprising:

2×p poles,and

2×p paths, wherein the windings of the poles by the paths differ from one another in that each path winds two adjacent poles more heavily than the remaining poles, each pole being more heavily wound by two paths than by the remaining paths and a pole adjacent to said pole being differently wound by the two paths.

10. The winding according to claim 1, wherein the winding of the at least one pole is formed by at least two slot coils, and the windings of the at least one pole which are assigned to the paths, differ from one another in respect of the turns counts of the slot coils of the pole.

11. The winding according to claim 10, wherein the sum of the turns counts of all the paths is the same for each slot coil of the pole of which there is at least one.

12. The winding according to claim 10, wherein the turns counts of the paths are the same for the pole of which there is at least one.

13. The winding according to claim 10, wherein each path has at least two sub-sections, each sub-section winds each pole with half a turn, and wherein each sub-section is involved to the extent of no more than half turn in the winding of the same slot coil.

14. The winding according to claim 11, further comprising:

two paths, wherein each pole is formed by two slot coils, and each path winds only one slot coil of each pole.

15. The winding according to claim 1, wherein the poles are disposed evenly along a self-contained line.

16. The winding according to claim 1, which is implemented as a rotating field winding.

17. The winding according to claim 1, which has slots in which the paths are laid.

18. The winding according to claim 17, which has a number of slots per pole per phase that is a positive integer.

19. A winding comprising:

2×p poles forming p pole pairs, and at least one phase by which the poles are wound and which has p parallel paths, wherein at least two of the paths of the at least one phase differ from one another in the winding of at least one of the poles, wherein at least one pole is wound by at least two paths of the at least one phase, at least one of the paths is involved in the winding of at least two poles, the poles are wound by the paths so as to produce an essentially symmetrical electric loading of the phase, the windings of the at least one pole which are assigned to the paths, differ from one another in respect of the turns counts, at least one of the paths winds at least one of the poles more lightly than the remaining poles, and the windings of the poles by the paths differ from one another in that each path is in each case more lightly involved in the winding of each pole pair at a time than the remaining paths.

20. A winding comprising:

at least two poles at least one phase by which the poles are wound and which has at least two parallel paths, wherein the two paths differ from one another in the winding of at least one of the poles, at least one pole is wound by at least two paths, the two paths are involved in the winding of at least two poles, the poles are wound by the paths so as to produce an essentially symmetrical electric loading of the phase, the winding of the at least one pole is formed by at least two slot coils, the windings of the at least one pole which are assigned to the paths, differ from one another in respect of the turns counts of the slot coils of the pole, the sum of the turns counts of all the paths is the same for each slot coil of the pole of which there is at least one, each path of the at least one phase comprises three sub-sections, and each slot coil is wound by two sub-sections of one of the paths and by one sub-section of the other paths.

* * * * *